United States Patent
Beigneux et al.

(10) Patent No.: US 9,605,781 B2
(45) Date of Patent: Mar. 28, 2017

(54) THREADED CONNECTION COMPRISING AT LEAST ONE THREADED ELEMENT WITH AN END LIP FOR A METAL TUBE

(75) Inventors: Sylvain Beigneux, Valenciennes (FR); Daly Daly, Valenciennes (FR); Bertrand Maillon, Valenciennes (FR); Claire Patureau, Hesingue (FR); Eric Verger, Gommegnies (FR); Michihiko Iwamoto, Wakayama (JP); Keiichi Nakamura, Wakayama (JP); Masaaki Sugino, Nishinomiya (JP); Suguru Yamaguchi, Amagasaki (JP)

(73) Assignees: VALLOUREC OIL AND GAS FRANCE, Aulnoye-Aymeries (FR); NIPPON STEEL & SUMITOMO METAL CORPORATION, Chiyoda-ku (JP)

( * ) Notice: Subject to any disclaimer, the term of this patent is extended or adjusted under 35 U.S.C. 154(b) by 534 days.

(21) Appl. No.: 12/741,054

(22) PCT Filed: Nov. 3, 2008

(86) PCT No.: PCT/EP2008/009405
§ 371 (c)(1),
(2), (4) Date: Aug. 16, 2010

(87) PCT Pub. No.: WO2009/059778
PCT Pub. Date: May 14, 2009

(65) Prior Publication Data
US 2010/0301603 A1    Dec. 2, 2010

(30) Foreign Application Priority Data

Nov. 7, 2007    (FR) .................................. 07 07819

(51) Int. Cl.
*F16L 15/00*       (2006.01)
*E21B 17/042*      (2006.01)

(52) U.S. Cl.
CPC .......... *F16L 15/004* (2013.01); *E21B 17/042* (2013.01); *Y10T 29/49826* (2015.01);
(Continued)

(58) Field of Classification Search
CPC ...... F16L 15/004; F16L 15/009; E21B 17/042
(Continued)

(56) References Cited

U.S. PATENT DOCUMENTS 484,764 A * 10/1892 Elder ............................ 175/324
1,781,091 A * 11/1930 Wilson ..................... 285/148.19
(Continued)

FOREIGN PATENT DOCUMENTS

CN    1308704    8/2001
CN    1408046    4/2003
(Continued)

OTHER PUBLICATIONS

U.S. Appl. No. 13/142,493, filed Jun. 28, 2011, Patureau, et al.
U.S. Appl. No. 13/139,188, filed Jun. 10, 2011, Verger, et al.

*Primary Examiner* — David E Sosnowski
*Assistant Examiner* — James Linford
(74) *Attorney, Agent, or Firm* — Oblon, McClelland, Maier & Neustadt, L.L.P.

(57) ABSTRACT

A threaded tubular connection includes a female threaded portion at a first tubular component end and a male threaded portion at a second tubular component end, the female threaded portion including a female thread, at least one female sealing surface on its inner peripheral surface, and at least one female axial abutment surface, the male threaded portion including a male thread, at least one male sealing surface on its outer peripheral surface, at least one axial
(Continued)

abutment surface, and a lip disposed between the sealing surface and an axial abutment surface located at a free end of the threaded portion distant from the thread, the male thread being made up into the female thread such that at least one male axial abutment surface is in contact with at least one female axial abutment surface, at least one male sealing surface being in interference contact with at least one corresponding female sealing surface, the portion of the lip between the sealing surface and the axial abutment surface being radially distant from a corresponding surface of the other threaded portion, at least one leak channel being provided in one of the threaded portions to place the chamber formed between the lip and the corresponding surface of the other threaded portion in communication with the interior of the connection.

17 Claims, 2 Drawing Sheets

(52) U.S. Cl.
CPC .............. *Y10T 82/10* (2015.01); *Y10T 408/03* (2015.01); *Y10T 409/303752* (2015.01)

(58) Field of Classification Search
USPC ............................................. 285/333, 13, 14
See application file for complete search history.

(56) References Cited

U.S. PATENT DOCUMENTS

| | | | | |
|---|---|---|---|---|
| 1,911,938 | A | * | 5/1933 | Norwood ........................ 285/13 |
| 1,964,044 | A | * | 6/1934 | Engel .............................. 285/13 |
| 2,104,799 | A | | 1/1938 | Evans |
| 2,140,467 | A | * | 12/1938 | Cargile ............................ 285/40 |
| 2,992,019 | A | | 7/1961 | MaCarthur |
| 3,822,902 | A | | 7/1974 | Maurer et al. |
| 3,870,351 | A | * | 3/1975 | Matsuki ........................ 285/334 |
| 4,611,838 | A | | 9/1986 | Heilmann et al. |
| 4,736,967 | A | | 4/1988 | Mott et al. |
| 4,750,761 | A | | 6/1988 | Watts |
| 5,257,835 | A | * | 11/1993 | Baumbach et al. .......... 285/330 |
| 6,047,797 | A | | 4/2000 | Popjoy |
| 6,431,608 | B1 | * | 8/2002 | Kato ............................... 285/13 |
| 6,485,063 | B1 | * | 11/2002 | Olivier .................. E21B 17/042 285/331 |
| 2003/0025327 | A1 | | 2/2003 | Mannella |
| 2004/0135370 | A1 | | 7/2004 | Evans et al. |
| 2008/0012320 | A1 | | 1/2008 | Evans et al. |
| 2011/0068574 | A1 | * | 3/2011 | Morgan et al. ................ 285/333 |

FOREIGN PATENT DOCUMENTS

| | | |
|---|---|---|
| DE | 32 07 237 | 9/1983 |
| EP | 0 454 147 | 10/1991 |
| EP | 0 488 912 | 6/1992 |
| FR | 2 281 488 | 3/1976 |
| GB | 2 119 044 | 11/1983 |
| GB | 2 394 237 | 8/2006 |
| JP | 57-186690 A | 11/1982 |
| JP | 59-137694 | 8/1984 |
| JP | 61-62694 | 3/1986 |
| JP | 2003-21278 A | 1/2003 |
| JP | 2004-42066 A | 2/2004 |
| JP | 2004-507698 A | 3/2004 |
| JP | 2005-511990 A | 4/2005 |
| WO | WO 2004/060590 | 7/2004 |
| WO | WO 2004/109173 | 12/2004 |
| WO | WO 2007/017082 | 2/2007 |

* cited by examiner

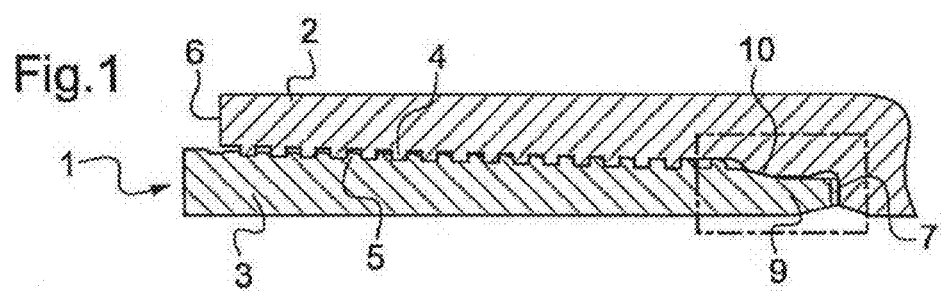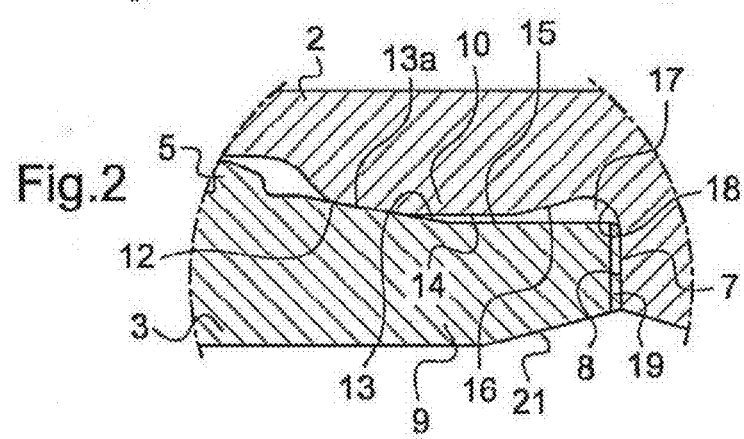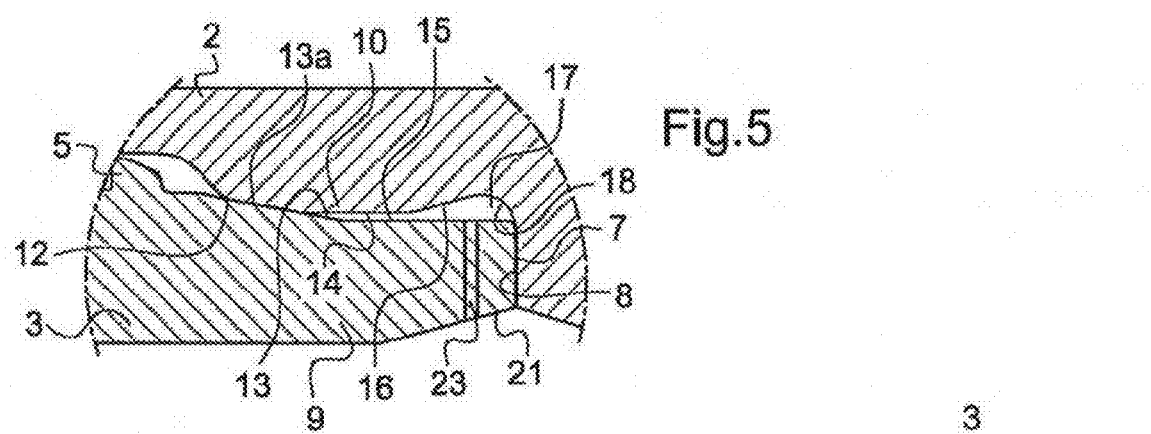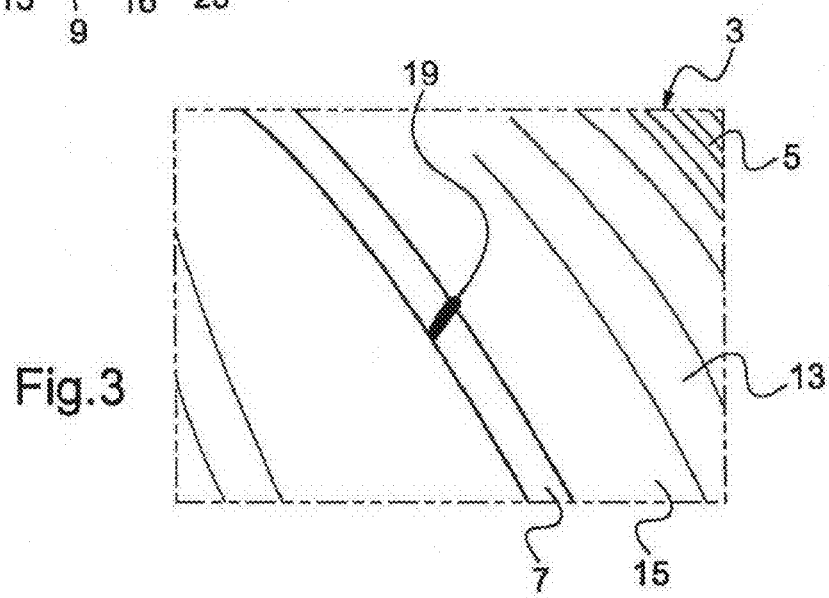

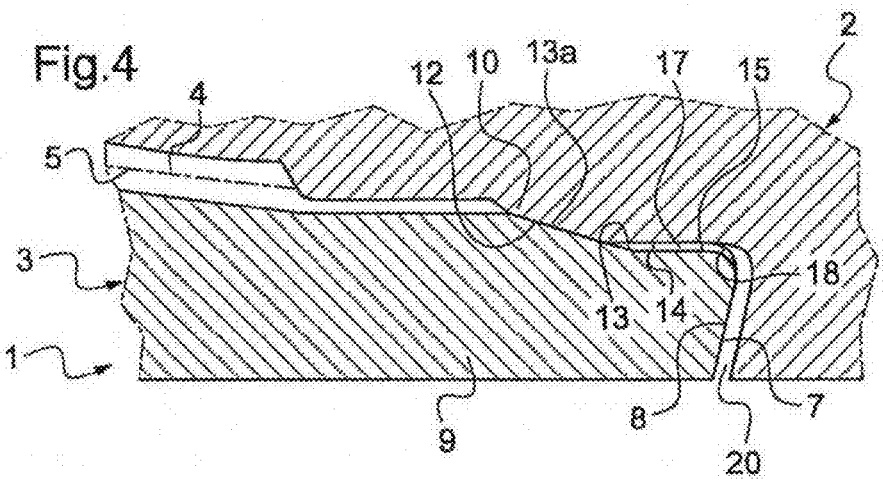
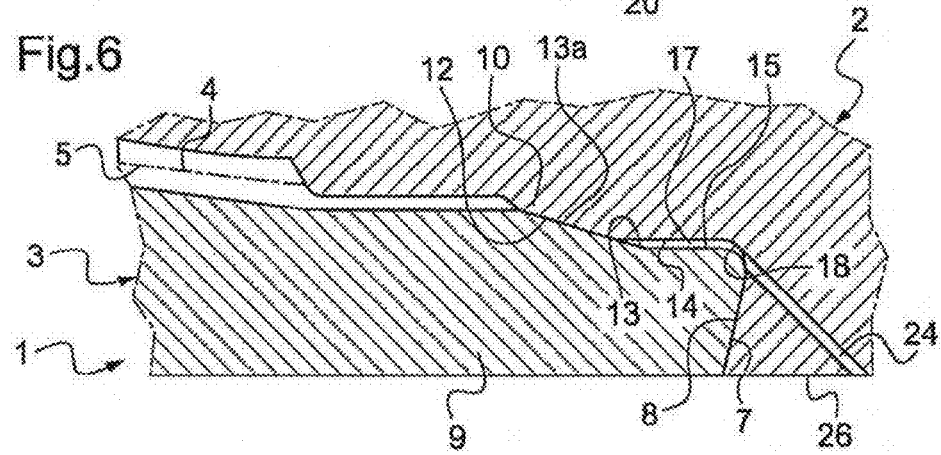
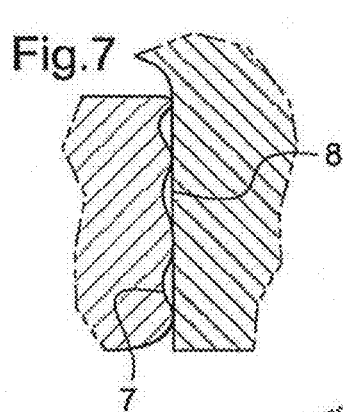
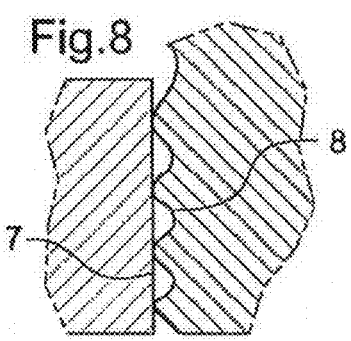
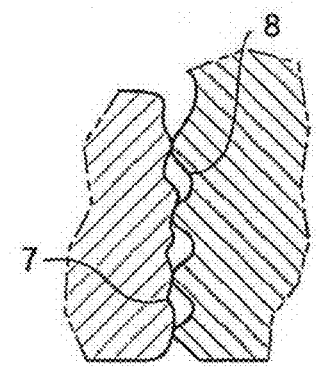
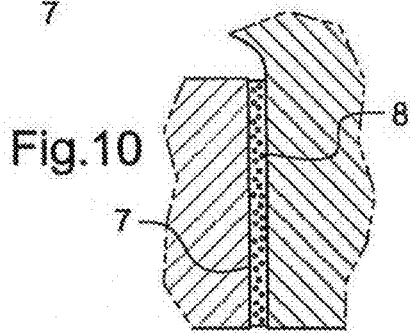
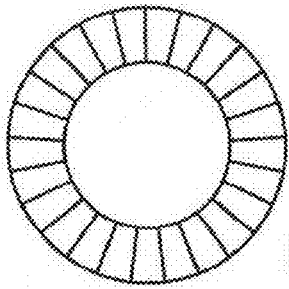

THREADED CONNECTION COMPRISING AT LEAST ONE THREADED ELEMENT WITH AN END LIP FOR A METAL TUBE

The invention relates to the field of premium threaded tubular connections used in particular to connect steel tubes, such as drillpipe tubes, for example interior or exterior. Such tube types are used in exploration and in oil and gas production. In such applications, the tubes must have an excellent seal while also being resistant to compression and tension.

Threaded tubular connection types are known which are primarily used to produce casing strings, tubing strings or drillpipe strings for hydrocarbon or the like wells, in particular geothermal wells.

Threaded tubular connections are also known on risers intended to connect a well opening onto the ocean floor to an offshore platform.

The American Petroleum Institute (API) defines, in its 5CT and 5B specifications, standard threaded tubular connections the seal of which results from applying a compound grease (or dope) between the male and female threads and wherein its seal performance is consequently limited to liquids under pressure or to gas under low pressure.

Premium threaded connections developed outside API standards by certain manufacturers generally comprise a set of metal-metal sealing surfaces and makeup abutments on male and female threaded elements which constitute the threaded connection. The threaded elements are formed at the end of a tubular great length type tubular component or, in contrast, a coupling type short tube. The high pressure fluid (liquid or gas) seal results from mutual radial interference of the sealing surfaces. The intensity of the radial interference fit is a function of the relative axial positioning of the male and female threaded elements and is thus defined by abutment of these elements by said makeup abutments.

The aim of the invention is to improve the seal of a threaded tubular connection, in particular a ready-to-use threaded tubular connection.

The ready-to-use threaded tubular connection comprises a female threaded portion at the end of a first tubular component and a male threaded portion at the end of a second tubular component. The female threaded portion comprises a female thread, at least one female sealing surface on its inner peripheral surface and at least one female axial abutment surface. The male threaded portion comprises a male thread, at least one male sealing surface on its outer peripheral surface, at least one male axial abutment surface, and a lip provided between the male thread and an axial abutment surface. The axial abutment surface is located at a free end of said threaded portion which is distant from the thread. The male sealing surface is located on the lip and in particular close to the thread. The male thread is engaged with the female thread such that the male axial abutment surface is in contact with the female axial abutment surface. The male sealing surface is in interference contact with the corresponding female sealing surface. A distal portion of the lip between the male sealing surface and the axial abutment surface is radially distant from a corresponding surface of the other threaded portion. At least one leak (bleed) channel is provided in one of the male and female threaded portions to place a chamber, formed between the distal portion of the lip and the corresponding surface of the other threaded portion, in communication with the interior of the connection.

Thus, the internal pressure in the threaded connection and the pressure prevailing in said chamber can be equalized. Inwardly directed radial forces exerted on the lip are thus reduced. The resulting deformation can thus be avoided or at least very substantially reduced. On the one hand the sealing surfaces remain in contact because the lip does not deform much. On the other hand the reduction in the pressure prevailing in the chamber in the case in which, after an axial tension phase with a high internal pressure, a zero axial tension phase occurs (or an axial compression phase) with a high internal pressure then a phase without axial tension (or an axial compression phase) at a low internal pressure enables to reduce the pressure difference between the pressure inside the threaded connection and the pressure in said chamber. In other words, the leak (bleed) channel in the male portion or in the female portion provides a dual reduction in the leak (bleed) of the connection, firstly by increasing the contact pressure of the sealing surfaces and secondly by reducing the pressure difference either side of said sealing surfaces. As a result, leaks are substantially reduced.

In other words, the threaded tubular connection comprises a means for equalizing the pressure between the interior of the connection and the substantially annular non-zero volume space between the male and female sealing surfaces and the male and female axial abutments. The pressure is equalized in a manner which is relatively independent of the axial force experienced by the connection. The axial force may be tension or compression. In the event of a relatively high tensional force, the male and female axial abutments may separate. In the other cases, in particular under low tension, zero axial force or compression, the male and female axial abutment surfaces are in contact. The leak channel ensures that the pressure between the interior of the tube and the space located axially between the axial abutments and the sealing surfaces is equalized. This thereby improves the effectiveness of the sealing surfaces while preserving the function of the axial abutments. Previously, a leak could occur following a phase of tension and internal pressure, then a phase of internal pressure and low tension or compression and finally a phase of low tension or compression without internal pressure.

The present invention will be better understood from the following detailed description of several embodiments which are given by way of non-limiting examples and illustrated in the accompanying drawings, in which:

FIG. 1 is an axial sectional half view of a threaded tubular connection;

FIG. 2 is a detailed view of FIG. 1;

FIG. 3 is a perspective view of the female portion of a threaded tubular connection;

FIG. 4 is an axial sectional half view of a threaded tubular connection;

FIG. 5 is an axial sectional half view of a threaded tubular connection;

FIG. 6 is an axial sectional half view of a threaded tubular connection;

FIGS. 7 to 9 are detailed views of the roughness;

FIG. 10 is a detailed view of the pores; and

FIG. 11 is a front view of the radial grooves.

Threaded tubular connections are subjected to axial tensional or compressive loads, to internal or external fluid pressure, bending or torsional loads, which may be combined and of fluctuating intensity. The seal must be guaranteed despite the loads and despite the severe on-site service conditions. The threaded connections must be capable of being made up and broken out several times without a drop in performance, especially by galling. After breaking out, the tubular components may be re-used under other service conditions.

To simulate the various loads to which a threaded connection may be subjected, the threaded connections may be subjected to combined load cycles in accordance with International standard ISO 13679: 2002.

These combined load cycles are included in a performance envelope termed the VME (Von Mises Ellipse), defined by the elastic limit of the material and the geometry of the tubular components.

Such cycles thus allow the application to the threaded connection of alternating loads combining internal pressure and/or axial tension, or axial compression, or combining external pressure and/or axial tension or axial compression, to be envisaged.

The sealing surfaces of the threaded connections must be strong and remain sealed over the whole cycle.

Known premium threaded connections such as those described in EP 0 488 912 employ a male sealing surface located at the end of the outer surface of a lip extending the male thread and adjacent to the radial surface of the free end forming the axial abutment.

International patent document WO 2004/109173 describes a threaded connection comprising a male portion provided with an axial abutment at the free end of the male portion and provided to be in contact with an axial abutment of the female portion and a lip extending between the thread and the axial abutment, said lip comprising a substantially tapered sealing surface close to the thread and thus at a distance from the axial abutment, the portion of the lip between the sealing surface and the axial abutment having an outer surface with a diameter very slightly smaller than the corresponding surface of the female portion. That type of threaded connection has high performances in tests and in actual use.

However, the Applicant has observed that in actual use, the lip of the male portion can in some cases deform radially inwardly. Plastic deformation of the lip may occur with detrimental consequences: leaking at the sealing surfaces, loss of the structural integrity of the threaded connection during subsequent compressive loads, a risk of tools lowered inside the tubes becoming stuck, etc.

During the course of intensive research, the Applicant discovered a physical phenomenon which has been ignored up to now, namely that pressure is trapped in the small substantially annular volume existing between the male and female sealing surfaces and the male and female axial abutments, in particular a threaded connection of the type described in WO 2004/109173. In the case in which a large axial tensional load is exerted on the threaded connection, the male and female axial abutments may separate, the sealing surfaces remaining in tight (sealed) contact. The fluid present in the threaded connection may then spread into the space between the axial abutments and into the space between the axial abutments and the sealing surfaces. Subsequently, when the tensional load ceases or when the load becomes compressive, the axial abutments are again in mutual contact, in that way providing a seal and leaving a space between the axial abutments and the sealing surfaces containing said fluid present in the connection at the high pressure prevailing in the connection when the tensional load ceased. When the internal pressure on the connection drops, said space between the axial abutments and the sealing abutments remains filled with said fluid at a high pressure.

Since the female portion facing the lip of the male portion is constructed to have a rigidity which is greater than that of the lip of the male portion, the lip of the male portion thus tends to deviate inwardly under the effect of said high pressure trapped in said space, while the inner surface of the lip is now only subjected to a low pressure. The radial inward deformation of the lip of the male portion may then cause a leak, allowing fluid to pass between the sealing surfaces and to spread into the thread. Apart from a loss of fluid circulating inside the tubes and a reduction in the productivity of the well, this may result in contamination of the fluid outside the tube by a fluid present inside the tube. Further, the radial deformation of the lip may cause leaks when the threaded connection is once again subjected to high internal or external fluid pressures.

Further, the radial deformation of the lip may cause loss of structural integrity in compression and cause tools moving inside the tubes to become stuck.

Such a phenomenon of internal pressure being trapped, of leaking problems and other resulting problems, were completely unknown in the art because the male sealing surface is generally located at the end of the lip and is adjacent to the abutment in the majority of premium threaded connections.

Further, the Applicant did not immediately notice the problems with the threaded connection of WO 2004/109173 because paragraph 6-7 of the ISO 13679:2002 standard test requires that threaded connections to be tested must be specifically modified to test the sealing surfaces. During such tests on threaded connections which have been modified to be tested, problems which may arise on a commercial ready-to-use threaded connection cannot come to light. By chance, the Applicant became aware that the normalized tests were not representative of the actual behaviour of a connection.

The Applicant had to carry out tests on a threaded connection which was equipped to measure the pressure in the annular space between the bearing surfaces and abutments in order to appreciate the trapping phenomenon. The Applicant then sought to overcome this new trapping problem, in particular by improving the overall seal of the connection.

As can be seen in FIG. 1, a threaded tubular connection 1 comprises a female portion 2 and a male portion 3. The female portion 2 and/or the male portion 3 may form part of a tube several meters in length, for example of the order of 10 to 15 meters long. One of the portions, generally the female portion, may constitute the end of a coupling, in other words a short length tube enabling to connect two great length tubes each end of which is provided with male portions (threaded and coupled connection, T&C). A coupling may thus be provided with two female portions. In a variation, a great length tube may be provided with a male portion and a female portion (integral threaded connection coupling). Connection 1 is of the industrial series type.

Connection 1 may be used to constitute casing strings or tubing strings for hydrocarbon wells, risers or drill strings for those same wells.

The tubes may be produced from different types of non alloyed, low alloy or high alloy steel, or from a ferrous or non ferrous alloy, heat treated or cold worked depending on the service conditions, such as: level of mechanical load, corrosive nature of the fluid inside or outside the tubes, etc.

It is also possible to use low corrosion-resistant steel tubes coated with a protective coating, for example a corrosion-resistant alloy or a synthetic material.

The threaded female portion 2 comprises a female thread 4 with trapezoidal threads, for example in accordance with specification API 5B (American Petroleum Institute) or derived from that specification (for example a thread with a hooked load flank, or "hooked thread", such as the thread on the Applicant's VAM TOP® threaded connection). The female thread 4 is tapered, for example at an angle in the range 0.5° to 3°, preferably in the range 1° to 2°. The female thread 4 is disposed on the inside of the female element. The male portion 3 comprises a male thread 5 disposed on one outer surface of said male portion 3. The male thread 5 engages with the female thread 4. The female portion 2 comprises a free end 6 to the side of threads 4 and 5 opposite to a free end 7 of the male portion 3. The male thread 5 has a taper which is substantially equal to that of the female thread 4.

The free end 7 of the male portion 3 is in the form of a radial annular surface. The free end 7 forms an axial abutment enabling to limit relative axial movement between the female portion 2 and the male portion 3. The free end 7 is in contact against a shoulder 8 of the female portion 2. The shoulder 8 is substantially radial in this case. Between the thread 4 and the shoulder 8, the female portion comprises a radial bulge 10 which projects outwardly with respect to the thread 4. The bulge 10 has a substantially tapered surface 12 and a substantially cylindrical surface of revolution 14 disposed between the substantially tapered surface 12 and the shoulder 8. An annular recess 16 is arranged in the female portion 2 between the substantially cylindrical surface 14 and the shoulder 8, connecting to said shoulder 8 via a rounded fillet 18. The diameter of the recess 16 is greater than the diameter of the cylindrical surface 14. The free end 7 may have a toroidal shape, as described in U.S. Pat. No. 3,870,351 or WO 2007/017082, it may be stepped as in the document U.S. Pat. No. 4,611,838, or it may have a protuberance as in document U.S. Pat. No. 6,047,797 or a combination of those shapes.

The male portion 3 comprises a lip 9 extending axially beyond the male thread 5 to the free end 7. The lip 9 comprises an external substantially tapered surface 13 with an axial length which is slightly greater than the axial length of the substantially tapered surface 12 of the female portion 2. A portion 13a, which is also termed a surface, of the substantially tapered surface 13 and the substantially tapered surface 12 are in mutual radial interfering contact in the made up position of the connection 1 shown in the Figures. The surfaces 12 and 13a form sealing surfaces which enable to prevent fluid from moving between the interior and exterior of the connection. The angle of taper of the surfaces 12 and 13a may be in the range 5° to 25°, preferably in the range 10° to 20°, for example 14°. The angle of taper of these surfaces 12 and 13a is greater than the angle of taper of the threads.

The lip 9 of the male portion 3 comprises a substantially cylindrical surface 15 extending between the substantially tapered surface 13 and the free end 7 of the male portion 3 (distal portion of the lip). The length of the distal portion of the lip, between the end of the substantially tapered surface 12 and the geometric point of intersection between an outer lip surface, for example the substantially cylindrical surface 15, and the abutment surface of the free end 7, may be in the range 4 to 20 mm depending on the diameter of the tube, between 50 and 550 mm, for example between 9 and 16 mm for a 250 mm tube. Since the substantially tapered surface 13 extends beyond the substantially tapered surfaces 12 and 13a in the direction of the free end 7, the substantially cylindrical surface 15 has a diameter which is slightly smaller than the diameter of the substantially cylindrical surface 14 of the female portion 2. The substantially cylindrical surface 15 joins the free end 7 via a low radius connecting fillet, for example of between 0.4 and 1.5 mm, preferably between 1 and 1.5 mm. The substantially cylindrical surface 15 also has a diameter which is smaller than that of the recess 16. A substantially annular chamber 17 is thus formed between the female portion 2 and the distal portion of the lip 9 on the male portion 3.

As can be seen in FIG. 2, the chamber 17 is internally defined by the substantially cylindrical surface 15 and an end portion of the substantially tapered surface 13 of the male portion 3 beyond the surface 13a, and externally defined by the substantially cylindrical surface 14 and the recess 16 of the female portion 2.

At least one radial groove 19 is provided in the male portion 3. The radial groove 19 is formed starting from the free end 7 and extending radially between the outer substantially cylindrical surface 15 and an inner surface 21 of the male portion 3. The inner surface 21 may be in the form of a tapered chamfer. The groove 19 provides fluid communication between the chamber 17 and the interior of the connection 1. The groove may have a width and depth of at least 0.1 mm and preferably at least 0.2 mm.

When using the connection 1, the groove 19 forms a means for equalizing pressure between the pressure inside the connection 1 and the pressure in the chamber 17. Said pressure equalization means is able to function in a relatively independent manner with respect to the axial load to which connection 1 is subjected. The axial load may be tension which can arise until contact between the free end 7 and the shoulder 8 is lost. An axial compressive load may cause a high contact pressure between the free end 7 of the male portion 3 and the shoulder 8 of the female portion 2.

In the embodiment shown in FIG. 4, the pressure equalization means is in the form of a groove 20 provided in the shoulder 8 of the female portion 2. The shoulder 8 in this case has a slightly tapered shape (peak half angle of the cone in the range 70 to 80 degrees, for example). The inner surfaces of the female 2 and male 3 portions are substantially cylindrical. The slightly tapered shape of the shoulder 8 and the free end 7 of the male portion 3 may be provided in combination with a pressure equalization groove provided in the free end 7 of the male portion 3.

In the embodiment shown in FIG. 5, a through hole 23 is provided in the male portion 3 close to the free end 7. The free end 7 and the shoulder 8 are in this case substantially radial, but could be inclined. The hole 23 places the chamber 17 in communication with the interior of the connection 1. The hole may have a diameter in the range 0.5 mm to 10 mm, preferably in the range 1 mm to 6 mm. The hole 23 may be substantially radial. The hole 23 extends between the chamfer 21 of the male portion 3 and the substantially axial surface 15 of said male portion 3. The hole 23 may also be located further from the abutment of the free end 7 provided that it does not affect the material corresponding to the male sealing surface.

In the embodiment shown in FIG. 6, a pressure equalization hole 24 is provided in the female portion 2. The hole 24 is oblique with respect to the general axis of the connection 1. The hole 24 extends between an inner axial surface 26 of the female portion 2 at a distance from the shoulder 8 and the rounded connecting fillet 18.

In the embodiments shown in FIGS. 4 and 6, the volume of the chamber 17 is smaller volume than in other embodiments due to the absence of an recess 16. The substantially axial surface 14 extends to the rounded connecting fillet 18. The free end 7 and the shoulder 8 of the female portion 2 in this case have a slightly tapered shape, but they could be planar (radial orientation). The through hole 24 may be provided in a portion of the female portion 2 which is less stressed than the lip of the male portion 3.

In one embodiment, the groove 16 or 19 spirals on the abutment. The spiral form may be produced on a lathe, which proves to be economic.

In a variation, the groove is the result of coarse roughness (roughness Ra of more than 25 micrometers, for example) on at least the free end 7 or shoulder 8, obtained by high speed lathe turning or by shot blasting or by sand blasting or etching (chemical, electrolytic, laser) of this or these surfaces. The groove may also be obtained by depositing a rough metallic or non metallic coating (for example of synthetic material), the roughness of the deposited coating resulting from the deposition conditions; see FIG. 7.

In other words, a threaded tubular connection comprises a pressure release channel which is configured to limit a pressure difference between the interior of the connection and a zone located outwardly of a distal portion of a lip on the male portion, said distal lip portion extending between the male sealing surface and a free end of said male portion. Said zone is radially inwardly defined by an outer surface of the male portion and outwardly defined by an inner surface of the female portion. Said zone is axially defined on one side by the sealing surfaces of the male and female portions, and on the other side by the axial abutment surfaces limiting the engagement of the threads and the sealing surfaces.

The leak channel may be provided in the male portion, for example in the lip. The leak channel may be provided in the female portion. The channel may be provided in a zone which is less stressed by axial tension.

The leak channel may be single or multiple, for example several holes or grooves distributed over the circumference of the male or female portion concerned. In the case of multiple grooves, these may form a circumferential undulation of the profile of the male and/or female abutment surface to produce one or more grooved abutment surfaces; see FIG. 11.

The leak channel may comprise at least one hole. The hole may be provided in the distal lip portion and open onto an inner surface of the male portion on the one hand and onto an outer surface of the distal lip portion of the male portion on the other hand.

The hole may be provided to the side of the female axial abutment surface in the lip. The hole may be provided between an inner surface of the female portion and a surface of the female portion facing the male threaded portion. More particularly, the hole may be inclined with respect to the axis of the connection. The hole may open onto the inner surface of the female portion at a distance from the axial abutment. In contrast, the hole may open onto a rounded connecting fillet between the axial abutment of the female portion and the surface of the female portion facing the lip of the male portion.

The leak channel may comprise at least one groove in one and/or the other of the male and female abutment surfaces. The groove may be substantially radial or inclined. The groove may have a substantially semi-circular cross-section. Alternatively, the groove may have a substantially rectangular or triangular cross-section.

The leak channel may be obtained by the great roughness in at least one of the male or female abutment surfaces.

In one manufacturing method, the leak channel is produced by drilling.

In another manufacturing method, the leak channel is obtained by milling. A groove with a rectangular section may be obtained.

In another manufacturing method, the leak channel is obtained by rolling or coarse lathing at least one of the male or female abutment surfaces. A groove with a semi-circular, rectangular, triangular or rounded cross-section may be obtained.

In another manufacturing method, the leak channel is obtained by depositing, electrolytically or in similar manner, a porous metallic material or a porous synthetic material or by fixing a separate porous part (metallic or of synthetic material) to at least the male or female abutment surface, the porous material or the attached porous part having a controlled open porosity to allow the pressure between the chamber 17 and the interior of the connection to equilibrate (see FIG. 10).

This provides an industrial threaded tubular connection which is particularly resistant to pressure and to variations in axial pressure and loads, which in particular is resistant to cycles of axial tension and high internal pressure then compression, then low internal pressure.

The leak channel is applicable to numerous thread types (simple or in several portions which may or may not be stepped, or cylindrical or tapered).

The threads may be radial interference threads or of the contacting flank type as described in EP 0 454 147.

The male and/or female sealing surface may be toroidal or comprise a toroidal portion on the thread side and a tapered portion on the abutment side.

Finally, the leak channel may be applied to threaded connections with an external abutment at the female free end, with a female lip between the female thread and the external abutment and with a sealing surface disposed on the female lip close to the female thread.

A leak channel can place the chamber between the female lip and the corresponding male surface in communication with the exterior of the connection to prevent leaks caused by trapping external pressure.

The invention claimed is:

1. A ready-to-use threaded tubular connection to constitute casing strings or tubing strings for hydrocarbon wells, risers or drill strings for those same wells, comprising:

a female threaded portion at an end of a first tubular component and a male threaded portion at an end of a second tubular component, the female threaded portion comprising a female thread, at least one female sealing surface on its inner peripheral surface, and at least one female axial abutment surface, the male threaded portion comprising a male thread, at least one male sealing surface on its outer peripheral surface, at least one male axial abutment surface, and a lip provided between the male thread and a male axial abutment surface located at a free end of the threaded portion which is distant from the thread, the male sealing surface being located on the lip adjacent to the thread, the male thread being made up into the female thread such that the male axial abutment surface is in contact with the female axial abutment surface, the male sealing surface being in interference contact with the corresponding female sealing surface, in order to form a metal-to-metal seal, a distal portion of the lip between the male sealing surface and the male axial abutment surface being radially distant from a corresponding surface of the female threaded portion, wherein at least one leak channel, being substantially radial, is provided in one of the male or female threaded portions, the at least one leak channel placing an interior chamber, which is formed by both a surface of the distal portion of the lip that extends from the male sealing surface to the male axial abutment surface and by the corresponding surface of the female threaded portion that extends from the female sealing surface to the female axial abutment surface, in communication with the interior chamber of the connection when the male axial abutment surface is in contact with the female axial abutment surface, and wherein the at least one leak channel is offset from both of the axial abutment surfaces.

2. A connection according to claim 1, in which the leak channel is provided in the female threaded portion.

3. A connection according to claim 1, in which the leak channel is provided in the male threaded portion.

4. A connection according to claim 1, in which the leak channel comprises at least one hole.

5. A connection according to claim 4, in which the hole is provided in the lip and opens onto an inner surface and onto an outer surface of the lip.

6. A connection according to claim 4, in which the hole is provided on the side of the female axial abutment surface between an inner surface of the first tubular component beyond the female axial abutment surface and an inner surface of the female threaded portion facing the lip of the male threaded portion.

7. A connection according to claim 6, in which the hole is inclined with respect to the connection axis.

8. A connection according to claim 1, in which the leak channel comprises at least one groove.

9. A connection according to claim 8, in which the groove is substantially radial.

10. A connection according to claim 8, in which the groove is substantially inclined with respect to the radial direction.

11. A connection according to claim 8, in which the groove is substantially semi-circular in cross-section.

12. A connection according to claim 8, in which the groove is substantially rectangular in cross-section.

13. A method for manufacturing a connection according to claim 1, in which the leak channel is produced by drilling.

14. A method for manufacturing a connection according to claim 1, in which the leak channel is produced by milling.

15. A method for manufacturing a connection according to claim 1, in which the leak channel is obtained by rolling.

16. A method for manufacturing a connection according to claim 1, in which the leak channel is produced by high speed lathe turning.

17. A connection according to claim 1, wherein the chamber is formed directly between the surface of the distal portion of the lip and the corresponding surface of the female threaded portion.

* * * * *